July 23, 1968  F. S. CAMMISA  3,393,521
EXCAVATION SHORING FRAME ASSEMBLIES
Filed Nov. 2, 1966  2 Sheets-Sheet 2
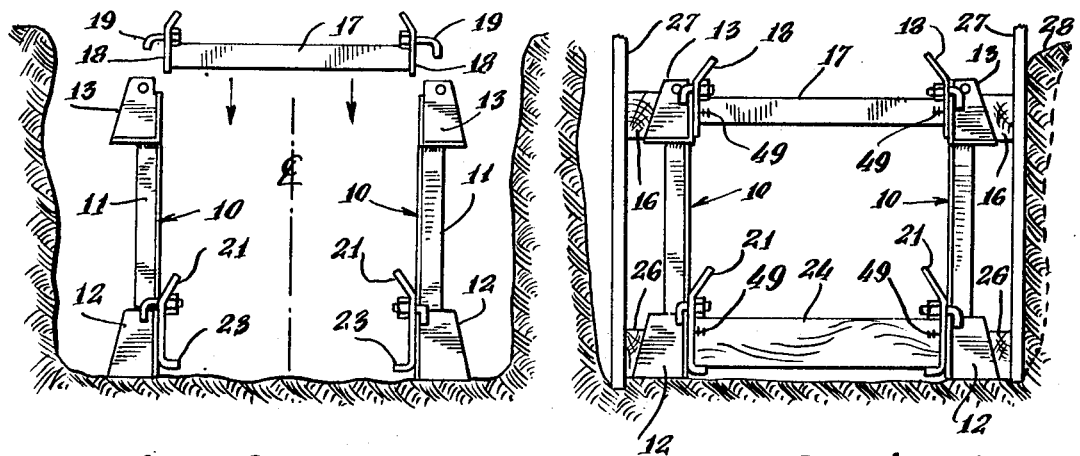
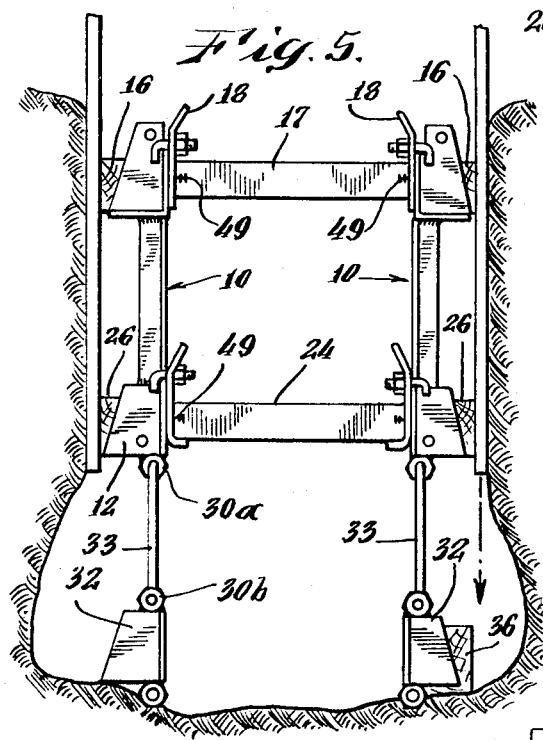
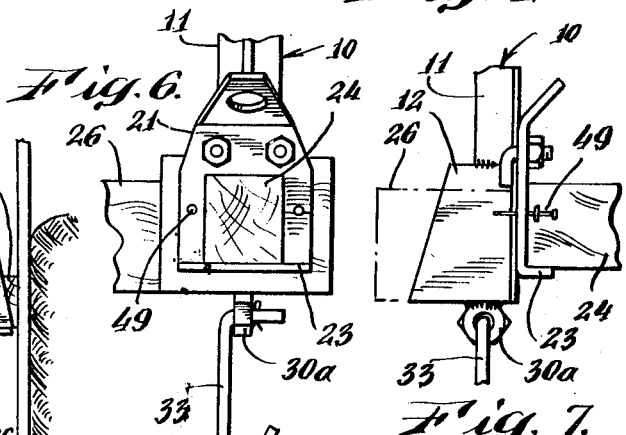
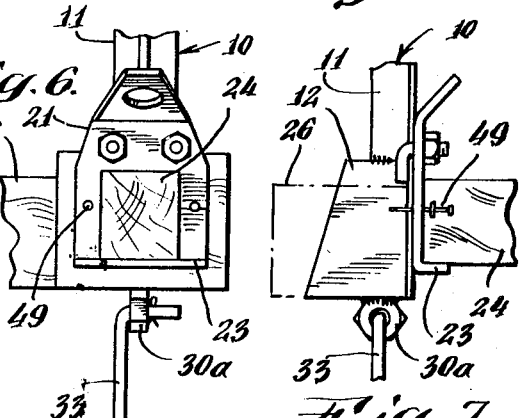
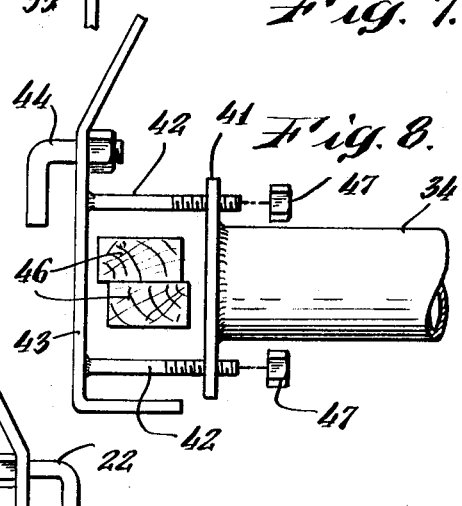
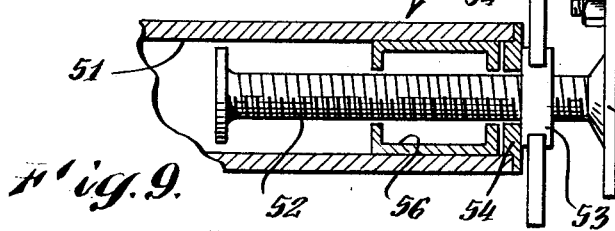
INVENTOR.
Francis S. Cammisa
BY
Robert H. Ware
ATTORNEY.

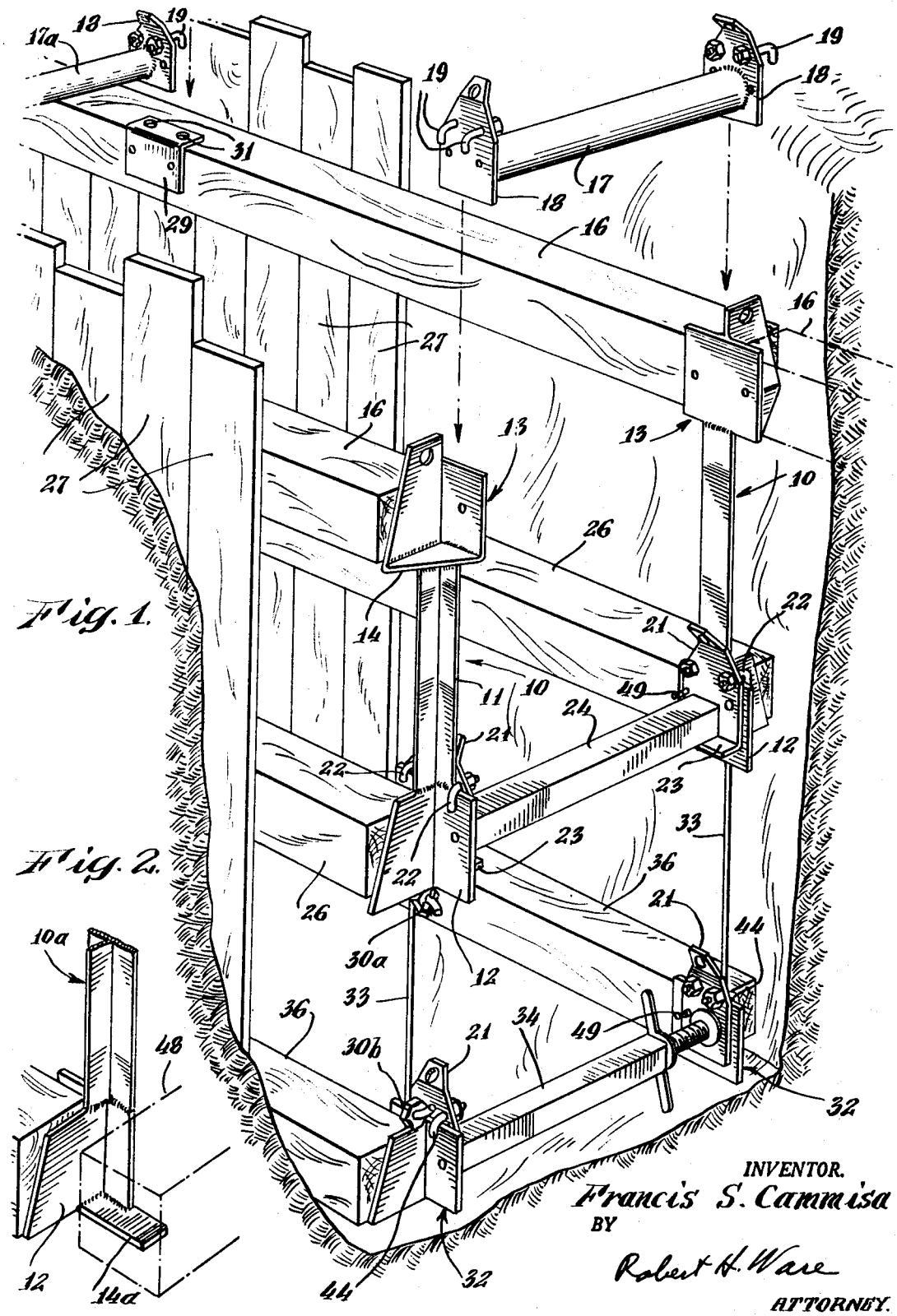

3,393,521
EXCAVATION SHORING FRAME ASSEMBLIES
Francis S. Cammisa, Long Meadow Hill Road,
Brookfield, Conn. 06804
Filed Nov. 2, 1966, Ser. No. 591,501
8 Claims. (Cl. 61—41)

ABSTRACT OF THE DISCLOSURE

This invention relates to lightweight, reusable frame structures for bracing and shoring the walls of trenches and excavations. In particular, this invention involves the erection of transverse frames at spaced points along the length of an excavation, forming these frames from modular members designed for speedy assembly and disassembly. These frames accommodate and support longitudinal beams or timbers, often called wales or rangers, and form therewith a sturdy, load-bearing framework against which sheeting of planks or like material is mounted to retain the walls of the excavation, which may then be back-filled against the exterior face of the sheeting.

PRIOR ART SHORING STRUCTURES

Frame structures for bracing and shoring the walls of excavations are reminiscent of heavy timber ship construction or the bulky timber frameworks employed in mine tunnels. In the past, they have generally required heavy vertical, transverse and longitudinal wooden beams, carefully cut and trimmed with saws and axes in order to be fitted together into a framework within the excavation. After such cutting and trimming, timber columns and beams were traditionally spiked together and solidly anchored in place. After work in the excavation was completed, such heavy timber structures were generally abandoned or destroyed, since the separate columns and beams had been trimmed to non-uniform lengths, and disassembly was costly in time and labor.

The frame assemblies of the present invention are economical to fabricate and extremely light in weight, permitting their storage, transportation and erection with a minimum of labor. They are easily assembled and disassembled, and the sturdy frame components can be reused many times. Extensible transverse "compensating" spacer beams are employed to increase the convenience of assembly and disassembly, and many of the structural components of the present invention can be fabricated from ends and scrap of rolled structural steel sections, such as I-beams, H-beams or T-beams.

Accordingly, a principal object of the invention is to provide modular, reusable frame structures for the bracing and shoring of excavations.

A further object is to provide such frame structures having components and sub-assemblies which are quickly and easily assembled and disassembled on the construction site.

Other and more specific objects will be apparent from the features, elements, combinations and operating procedures disclosed in the following detailed description and shown in the drawings, in which:

FIGURE 1 is a cut-away perspective view of a trench-like excavation showing a frame structure of the present invention installed in load-bearing position;

FIGURE 2 is a similar fragmentary schematic view showing one corner of a modified frame structure in a different embodiment of the invention;

FIGURES 3, 4 and 5 are transverse cross-sectional views of an excavation showing successive stages in the installation and erection of the frame structures of this invention, and the continuing deepening of the trench-like excavation as the frame assemblies of this invention are extended downward;

FIGURE 6 is a fragmentary front elevation view of a lower corner of a frame structure of the present invention, showing the disengageable assembly of the transverse spacer beams and vertical frame members;

FIGURE 7 is a corresponding fragmentary end elevation view of the assembly shown in FIGURE 6; and FIGURES 8 and 9 are fragmentary side elevation views, partially in section, showing the extensible ends of compensating transverse spacer braces of different types employed with modified embodiments of the present invention.

ASSEMBLY AND INSTALLATION OF FRAME ASSEMBLIES

The basic structural component of the frame assemblies of the present invention is a short upright post or vertical column 10, shown in FIGURE 1, preferably having a T-shaped cross-section whose webs and flanges are enlarged at the lower end to provide load-bearing support for the column. The upper end of each column 10 is likewise provided with webs and flanges forming a T-shaped cross-section, and the enlarged T-sections of the upper and lower ends of the column 10 are both dimensioned to receive and position the abutting ends of longitudinal timbers, as shown in FIGURE 1.

Thus, the column 10 may have a substantial central portion 11 of its length formed of a T-beam segment of moderate dimensions. The lower end the central portion 11 may be welded to the corresponding abutting end of a T-section cut from a much larger T-beam or from a short scrap length of an H-beam, severed across its web, producing integral T-section base portion 12.

A substantially similar top portion 13 formed of a similar segment of larger T-beam or web-severed H-beam segment is welded to the upper end of central portion 11 with the webs of portions 11, 12 and 13 being aligned, and with their respective flanges also being aligned. As shown in FIGURES 1, 3, 4 and 5 a hoisting aperture is preferably formed in the upper end of the web of top portion 13. As shown in FIGURE 1, a platform 14 positioned in a transverse, horizontal plane preferably spans the space between the web and flange of top portion 13 near the lower end thereof, forming a concave box corner or socket therewith accommodating the abutting end of a longitudinal timber 16.

As shown in FIGURE 3, the initial trench excavation is carried down to a depth slightly greater than the height of the columns 10, and a pair of these columns is then positioned to stand erect on the bottom of the trench, spaced with care at equal distances on opposite sides of the desired trench centerline. Transverse spacer braces or beams are then detachably installed to anchor the columns 10 spaced a fixed distance apart. Thus as shown in FIGURES 1, 3 and 4, an upper spacer beam 17 is formed of a length of heavy steel pipe or of a box-section beam having substantially flat end plates 18. As shown in FIGURE 1, each upper spacer beam 17 is provided with a pair of downturned hooks 19 projecting outward from each end thereof to flank the web of the top portion 13 of column 10. The upper spacer beam 17 is gently lowered into position between the facing flanges of the top portions 13 of the two columns 10 until the hooks 19 at its opposite ends overlie and engage the upper flange edge of top portions 13.

As shown in FIGURE 1, the hooks 19 are preferably formed as downturned ends of through bolts passing through aligned apertures in end plates 18 secured at each end of spacer beam 17, and these bolts are provided with nuts which may be turned to draw up the hooks 19 behind the flanges of top portion 13, locking beam 17 in clamped transverse position.

Lower spacer braces or beams 24 are dimensioned to extend transversely between base portions 12 of the columns 10, and are provided with end plates 21 having outwardly extending pairs of spaced, downturned hooks 22 positioned abutting the facing flanges of the base portions 12 of the two columns 10, with the hooks 22 flanking the web and engaging the upper flange edge thereof. The lower ends of end plates 21 are preferably formed as a beam-supporting shelf 23, as shown in FIGURE 1, and the upper ends of the plates 21 are preferably diagonally slanted inwardly toward each other and provided with a withdrawal aperture accommodating a crane hook for speedy and convenient disassembly when the frame structures of the invention are to be removed from the excavation.

Each lower spacer beam 24 may be formed from a suitable length of structural steel pipe, from a box-section beam, or from a precut length of timber, as indicated in FIGURES 1 and 4, and the ends of beam 24 are placed on the facing shelves 23 of the two facing end plates 21.

As shown in FIGURE 4, a pair of columns 10 joined by the detachable upper and lower spacer beams 17 and 24 forms a free standing frame section resting on the bottom of the trench, and the webs of the top and bottom portions of each column 10 may be spaced a predetermined distance longitudinally along the excavation from the corresponding webs of the next adjacent free-standing frame section formed of similar members 10, 17 and 24. Each successive pair of adjacent frame sections are thereby employed to position and support a pair of longitudinal timbers 16 whose ends rest on the platforms 14 of the columns 10, as well as a corresponding pair of longitudinal lower timbers 26 placed along the lower sides of the excavation, as shown in FIGURE 4.

The inwardly facing flanges of portions 12 and 13 overlie the inner faces of beams 16 and 26, and the laterally extending webs of portions 12 and 13 are interposed respectively between the abutting ends of successive pairs of beams 26 and 16, producing accurate aligned positioning of the longitudinal timbers.

The outwardly-facing surfaces of the timbers 16 and 26 are substantially aligned to support vertical sheeting 27, formed of planks, steel plates or similar sheeting material mounted on end, edge to edge, with their flat faces abutting the outwardly facing surfaces of the timbers 16 and 26 as shown in FIGURES 1 and 4. The upper sides of the excavation may then be refilled with "back fill" 28, as shown at the right-hand side of FIGURE 4, stabilizing the excavation and its supporting shoring framework to form a sturdy, integral structure.

Timbers 16 and 26 may be precut in any desired standard lengths, such as 10 feet, 15 feet or 20 feet, for example. With longitudinal timbers having a span of 20 feet or more, each upper timber 16 is preferably provided with a socket plate 29, shown in FIGURE 1, formed from a suitable short length of angle-section rolled structural steel, for example, having a flange overlying the inner upper edge of each timber 16 at its midpoint and provided with socket apertures 31 spaced to accommodate the hooks 19 on the end plate 18 of an upper spacer beam 17a, which may be lowered into position, as shown in FIGURE 1, to maintain the midpoints of the two transversely-spaced longitudinal timbers 16 in their predetermined, laterally-spaced position, in the same manner that the upper spacer beams 17 are lowered into position to complete the transverse frame sections of the structures of this invention.

If desired, the lower spacer beams 24 may be formed with integral end plates 21 anchored thereon, similar to the end plates 18 anchored to both ends of upper spacer beams 17, and this integral form of lower spacer beam is often more convenient when it is formed entirely of structural steel components, welded into a unitary structure. As suggested in FIGURES 3 and 4, however, the main body of the lower spacer beams 24 may be formed if desired from a length of timber which is conveniently accommodated between two separate facing end plates 21 mounted on the upper flange edges of lower portions 12 of the two columns 10 as shown in FIGURE 3, and in more detail in FIGURES 6 and 7.

Extended depth excavations

Following the construction of the basic rectangular frame assemblies 10–17–24 shown in FIGURE 4 supporting and spacing timbers 16 and 26, the assembled frame units and longitudinal timbers 16 and 26 together form a solid unitary shoring structure which is anchored firmly in position in the excavation by the addition of back fill 28 on both sides of the excavation, bearing against the outer sheeting 27 and thus holding the assembled framework firmly in position. Further excavation of the floor of the trench then may follow, and the earth underlying the columns 10 and timbers 26 may be cut away and removed, as indicated in FIGURE 5, to a depth corresponding to the height of the columns 10 for example.

Depending lower corner members 32 corresponding generally in shape to the base portions 12 of the columns 10 and similarly cut from short lengths of T-beam or web-severed H-beam rolled structural steel sections, are positioned along lower sides of the trench beneath the columns 10 and removably secured to depend therefrom by such means as the hanger rods 33 shown in the figures.

Thus in FIGURE 1, a hanger rod 33 with reversely bent hooked ends is positioned with its ends engaged in suitable apertures, formed in the facing edges of the base portion 12 and the corner member 32, such as the central apertures in two large, sturdy rings or nuts 30a and 30b respectively welded to the lower web-end of base portion 12 and to the upper web-end of corner member 32.

Alternative securing means for the hanger rods 33 may be employed if desired, but the use of large steel nuts welded to the facing web-ends of base portion 12 and corner member 32 of the aligned structural members, as shown in the figures, provides sturdy structural support while avoiding hooks or corners protruding into the trench which might be caught and damaged or dislodged by excavation equipment operating therein. The use of these rods 33 secured to the facing web-edges of base portion 12 and its corresponding corner member 32, or the use of substantially similar apertures passing through these web-edges, permits these apertures to be aligned on a vertical axis passing through the center of gravity of corner member 32, providing automatic self-alignment of this corner member directly beneath column 10, as indicated in FIGURE 1.

When third longitudinal timbers 36 are installed with their ends abutting the webs of corner members 32, close behind the flanges thereof, the flanges of these corner members may be anchored together at the desired lateral spacing by means of extensible transverse "compensating" spacer beams 34. These may be generally similar to the upper spaced beams 17, with permanent end plates 18 having hooks 19. However, if desired, they may be made like lower spacer beams 24 with integral or removable end plates 21; and in the preferred embodiment of the invention, as indicated in FIGURE 1, the extensible lower spacer beam 34 is formed as a jackpost with an extensible jackscrew 52 joining one end thereof to an end plate 21 provided with hooks 44 positioned to engage the upper flange edge of the corner member 32. When the extensible lower spacer beam 34 is extended by operation of its jackscrew 52, the lower timbers 36 are forced apart and positioned substantially in alignment with timbers 16 and 26, providing a solid base against which the sheeting planks 27 may be driven down to bear against the outer surface of the timbers 36, as indicated in FIGURE 5.

Further, deeper excavation of the trench may follow, with successive series of corner members 32 being suspended in vertically spaced tiers to accommodate additional longitudinal timbers 36.

One alternative form of extensible lower compensating spacer beam 34 is shown in FIGURE 8. Beam 34 is provided with a stud plate 41 apertured to receive threaded studs 42 extending toward it from the facing surface of a hooked end plate 43 otherwise similar to the end plate 21 shown in FIGURES 1, 6 and 7 and provided with outwardly extending hooks 44 positioned to engage the upper flange edge of the base portion 12 of the column 10 or of a corner member 32. One, two or more lengths 46 of standard lumber, such as 2 x 4's, may be placed between the stud plate 41 and the end plate 43 as shown in FIGURE 8, and the number and position of these lumber pieces 46 determines the spacing of plates 41 and 43. In FIGURE 8, lumber pieces 46 are shown positioned ready for the tightening of nuts 47 on studs 42 to draw stud plate 41 toward end plate 43 into clamping engagement with the lumber pieces 46, thus providing the predetermined spacing of the plates 41 and 43 to produce the desired overall length of the beam 34. Different sizes of the lumber pieces 46 may be clamped between the plates 41 and 43 to produce a wide variety of spacings, producing corresponding different predetermined lengths of the beam 34.

The preferred extensible compensating brace 34 shown in FIGURE 1 is shown in more detail in the fragmentary sectional elevation view of FIGURE 9, where it will be noted that the major portion of the brace 34 is formed of a hollow box-section 51 having a threaded jackscrew 52 freely and telescopingly inserted therein which has an end plate 21 provided with hooks 22 anchored on its protruding opposite end.

Handle sleeve 53 is threaded in the manner of a nut on the threaded jackscrew 52 for manual rotation along the jackscrew 52 until sleeve 53 reaches abutting engagement with an end cap 54 closing the jack end of box-section 51. Additional box-shaped reenforcing structure 56 may be positioned inside box-section 51 behind end cap 54, as shown in FIGURE 9, and both the cap 54 and structure 56 are apertured to permit free axial movement of jackscrew 52 therethrough along the axis of box-section 51.

The opposite end of the box-section 51 may be provided with a reverse configuration of the type shown in FIGURE 9, or the extensible compensating jackpost assembly 52 may there be omitted and the end plate 21 welded directly to the opposite end of box-section 51 if desired. This freely extensible compensating brace 34 with its jackscrew assembly 52 is highly useful in spreading the lower tiers of longitudinal timbers 36 shown in FIGURE 1. As it is driven downward in the more deeply excavated trench, the lower end of the sheeting 27 tends to toe inwardly toward the center line of the trench. By means of the compensating braces 34, the designed width of excavation between sheeting walls 27 may be maintained down to any desired depth, with any number of successive additional tiers of corner members 32 installed below the rectangular section formed by the members 10, 17 and 24 shown in the upper portion of FIGURE 5.

In the modified embodiment of column 10 identified as column 10a in FIGURE 2, a portion of a flange of base portion 12 is shown cut away to accommodate a transverse timber 48, shown in dashed lines, with its end resting on the partial platform 14a and its side resting against the exposed cut edge of the flange of base portion 12. By this means, either the top portion 13 or the base portion 12 of a column 10a or both may be modified to accommodate timbers positioned transversely or diagonally to correspond with a change of direction of the excavation. The frame assemblies of this invention may thus be adapted for the shoring and support of the walls of excavations which are designed to extend along non-straight directions.

DISASSEMBLY OF THE FRAME STRUCTURES

In contrast to the heavy timber beams and columns of conventional excavation shoring structures, the framing assemblies of the present invention are easily taken apart and removed from the excavation. Disassembly preferably proceeds from the lower portion of the trench toward its top, and the extensible lower spacer beam 34 is easily shortened and withdrawn freeing both corner members 32, after which the lowest longitudinal timbers 36 may be hoisted from the excavation. Cables or hooks secured in the hoisting apertures of end plates 21 will generally dislodge the lower spacer beams 24 quickly and easily, after refilling of the excavation has proceeded to this level. The removal of upper spacer beam 17 relieves the load on the entire structure, permitting the hoisting and removal of upper longitudinal beams 16 and lower longitudinal timbers 26. Sheeting 27 and at least upper timbers 16 are usually salvaged for re-use, and the modular structural components 10, 17 and 24 of these framing assemblies are easily retrieved and stored for future use.

As shown in the figures, the flanges of top portions 13 and base portions 12, and of corner members 32 are all provided with small through apertures, and end plates 21 and 18 are also provided with through apertures which align themselves with those of the flanges to permit double-headed nails 49 to be driven through the end plates' and flange sections' apertures into the ends of longitudinal timbers 16, 26 and 36 to anchor columns 10 and corner members 32 against longitudinal movement. Socket plates 29 positioned at the midpoints of the beams 16, 26 and 36 for central transverse bracing by braces 17a are provided with similar nailing apertures aligned with those in the end plates of the mating braces. These double-headed nails 49 are withdrawn and hooks 19, 22 and 44 are unclamped just prior to disassembly.

As shown in the figures, the end plate hooks 19, 22 and 44 are preferably formed downturned ends protruding outwardly and formed on through bolts mounted in suitable clamping apertures formed in the upper portions of the end plates 18, 21 and 43. The inwardly extending ends of these through bolts are threaded, and tightening nuts are mounted thereon for clamping the end plates with their hooks engaging the upper flange edges of the columns 10 or corner members 32. Tightening of the nuts on these through bolts draws their hooked portions 19, 22 and 44 into tight clamping engagement with the upper flange edges over which they are hooked. Loosening of the nuts correspondingly releases the end plates from this clamping engagement, permitting the upper transverse braces 17, the lower transverse braces 24 and the extensible compensating transverse braces 34 to be dislodged and withdrawn successively as required during the refilling of the excavation to successive levels.

When refilling has proceeded to the level just beneath the top portions 14 of columns 10, providing independent underlying support for the upper longitudinal timbers 16, columns 10 may have their apertured upper web ends engaged by the hook of a crane or other hoisting device. The columns 10 are most conveniently withdrawn by being rocked inwardly toward the center of the excavation to disengage their platforms 14 from beneath timbers 16, freeing the columns 10 to be drawn upwardly through the newly refilled earth in the excavation.

As shown in Table I, column 10 preferably has flange heights on its top portion 13 and base portion 12 which are several inches greater than the vertical thickness of the abutting longitudinal beams positioned by column 10, leaving excess vertical space for engagement of hooks 19, 22 or 44 over the upper flange edges.

*Table I*

| Heights of columns 10 flanges | Timber cross-section dimensions |
|---|---|
| 8″ | 6″ x 6″ or 6″ x 8″ timber |
| 10″ | 8″ x 8″ or 8″ x 10″ |
| 12″ | 10″ x 10″ or 10″ x 12″ |
| 14″ | 12″ x 12″ or 12″ x 14″ or 14″ x 14″ |

The average weight of columns 10 is between 50 and 70 pounds for a five foot tall column, and the braces 17 and 24 customarily weigh less than 60 pounds. These lightweights permit convenient storage, handling, installation, erection and disassembly of the shoring structures of this invention by a minimum crew of unskilled laborers, and a single crane operator can conveniently lower the longitudinal timbers into position as required. The structures of this invention thus provide extremely fast, reliable and economical framing assemblies which are highly useful in shoring excavations for pipelines, drains, foundations, utility tunnels and many other purposes.

While the objects of the invention are efficiently achieved by the preferred forms of the invention described in the foregoing specification, the invention also includes changes and variations falling within and between the definitions of the following claims.

I claim:

1. Excavation-shoring assemblies for supporting and retaining longitudinal ranger beams, comprising in combination a transverse frame including (A) a pair of columns each having a base portion with a web positionable between the juxtaposed ends of two consecutive lower ranger beams, connected by a central compressor-load-carrying section to a top portion at its upper end, comprising a horizontal ranger beam supporting plate having an upwardly extending web intermediate the ends of said plate, said web engageably positionable between the corresponding juxtaposed ends of two consecutive upper ranger beams, (B) a lower transverse brace with its ends respectively disengageably anchored to the base portion of one column of the pair, (C) and an upper transverse brace with ends respectively disengageably anchored to the top portion of one column of the pair, forming a substantially rigid four-sided transverse frame adapted to be engageably interposed between two upper pairs and two lower pairs of ranger beams juxtaposed end-to-end, to position and support the ranger beams as a rigid shoring structure co-acting with sheeting material and back fill to retain excavated walls in predetermined positions.

2. The combination defined in claim 1 wherein at least one of the transverse braces includes a central transverse beam portion having its ends engageable with separate end plates, with clamping hook means removably joining each end plate to one column.

3. The combination defined in claim 1 including apertures in the transverse brace ends and the column aligned to guide locking fastenings therethrough into the ends of the ranger beams.

4. The combination defined in claim 1 wherein at least one transverse brace is adjustably extensible to provide compensating transverse spacing between the columns.

5. The combination defined in claim 1 including hooked clamping through bolts captively mounted on each end of the braces for disengageable anchored clamping engagement with the columns.

6. The combination defined in claim 1 including corner members each having a web positionable between the juxtaposed ends of two consecutive third ranger beams positioned in longitudinal alignment spaced downwardly beneath said lower ranger beams, and each dependingly secured beneath the base portion of one of the columns by a detachable hanger rod.

7. The combination defined in claim 6 wherein the hanger rod is provided with hooke-shaped ends detachably secured in rings joined to the facing ends of the column base portion and the underlying corner member.

8. Excavation-shoring assemblies for supporting and retaining longitudinal ranger beams, comprising in combination a plurality of spaced transverse frames each including (A) a pair of columns each having a base portion at its lower end with a web positioned between the juxtaposed end of two consecutive lower ranger beams, connected by a central compressive-load-carrying section to a top portion at its upper end comprising a horizontal ranger beam supporting plate having an upwardly extending web intermediate the ends of said plate, said web engageably positioned between corresponding juxtaposed ends of two consecutive upper ranger beams (B) a lower transverse brace with its ends respectively disengageably anchored to the base portion of one column of the pair, (C) an upper transverse brace with its end respectively disengageably anchored to the top portion of one column of the pair, (D) and a supplementary transverse brace dimensioned to span the lateral space between the approximate midpoints of a level pair of longitudinal ranger beams and detachable clamping means removably anchoring each end of the supplementary transverse brace respectively to one of the level pair of ranger beams at its approximate midpoint.

References Cited

UNITED STATES PATENTS

| 841,773 | 1/1907 | Fitzgerald | 61—41 |
| 2,987,890 | 6/1961 | Druml | 61—41 |

JACOB SHAPIRO, *Primary Examiner.*